United States Patent
Tate et al.

(10) Patent No.: US 6,650,697 B1
(45) Date of Patent: Nov. 18, 2003

(54) WIRELINE COMMUNICATION SYSTEM AND METHOD OF FREQUENCY ALLOCATION THEREIN

(75) Inventors: Christopher Neville Tate, Bishops Shortford (GB); Leslie Derek Humphrey, Harlow (GB); Igor Kajetan Czajkowski, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/354,650

(22) Filed: Jul. 16, 1999

(30) Foreign Application Priority Data

Sep. 18, 1998 (GB) ............................................. 9820427

(51) Int. Cl.[7] ........................... H04L 5/16; H04M 11/00
(52) U.S. Cl. ..................... 375/222; 375/219; 379/90.01
(58) Field of Search ................................. 375/222, 219, 375/223; 379/27, 414, 417, 90.01; 709/200, 208; 370/482, 295, 360; 710/1

(56) References Cited

U.S. PATENT DOCUMENTS

| | | | | |
|---|---|---|---|---|
| 4,896,335 A | * | 1/1990 | Wong et al. | 375/59 |
| 5,479,447 A | * | 12/1995 | Chow et al. | 375/260 |
| 5,987,061 A | * | 11/1999 | Chen | 375/222 |
| 6,061,392 A | * | 5/2000 | Bremer et al. | 375/222 |
| 6,215,785 B1 | * | 4/2001 | Batruni et al. | 370/360 |
| 6,266,395 B1 | * | 7/2001 | Liu et al. | 379/27 |
| 6,292,559 B1 | * | 9/2001 | Gaikwad et al. | 379/417 |
| 6,424,636 B1 | * | 7/2002 | Seazholtz et al. | 370/295 |
| 6,424,661 B1 | * | 7/2002 | Bentley | 370/482 |

* cited by examiner

Primary Examiner—Stehen Chin
Assistant Examiner—Sam K. Ahn
(74) Attorney, Agent, or Firm—Barnes & Thornburg (57) ABSTRACT

To alleviate the requirement to back-off all up-link performance, such as by limiting power spectral density, to overcome far-end cross-talk problems otherwise associated with relatively short loop-length wireline links, the present invention partitions the frequency spectrum based on an estimate of the loop length of a subscriber unit (CPE) modem from an exchange (LTE) modem. Up to a threshold frequency ($f_{max}$) at which received transmissions from a subscriber having a longest loop length (115) become indistinguishable by the LTE modem from a noise floor (102), up-link performance on all loop lengths is limited to correspond to that of the longest loop. At frequencies above the threshold frequency ($f_{max}$), subsets of subscribers (152–154) having relatively short loop lengths (116–119) use high frequency carriers that have signal to noise ratios sufficient to support information transmission in these elevated frequency bands.

19 Claims, 4 Drawing Sheets

WIRELINE COMMUNICATION SYSTEM AND METHOD OF FREQUENCY ALLOCATION THEREIN

BACKGROUND TO THE INVENTION

This invention relates, in general, to a wireline communication system and an associated method of allocating frequencies for use in traffic communications. More particularly, but not exclusively, the present invention is applicable to bi-directional wireline communication systems that support digital subscriber line (xDSL) communication protocols, which wireline communication systems inherently suffer from the undesirable effects of cross-talk interference.

SUMMARY OF THE PRIOR ART

Telecommunication systems that interconnect wireline subscriber terminals are being developed to support broadband data communication. More particularly, recent developments in broadband communication protocols allow broadband data to be overlaid on narrowband voice or integrated service digital network (ISDN) traffic. Specifically, the interconnection of broadband modems located at the subscriber terminal and at an exchange allow current broadband access systems to communicate on spare spectrum (i.e. spare frequency channels) of a twisted pair communication resource; the spare frequency channels being isolated from conventionally encoded voice signals by a suitable filter. In this respect, and depending upon the complexity of the xDSL coding scheme, overlaid broadband systems can support data rates in excess of two Megabits per second (Mbps), although this rate is dependent upon the physical parameters of the connection, e.g. the overall length of the twisted pair and its composition and configuration.

Asymmetric Digital Subscriber Line (ADSL) and High-speed Digital Subscriber Line (HDSL) protocols, for example, can support data rates of 2 Mbps over distances of approximately three kilometers, while more complex schemes (such as VDSL) can support data rates of 8 Mbps and above over distances of, typically, less than two kilometers. Line codes such as discrete multi-tone (DMT), which can be used for Very high-speed Digital Subscriber Line (VDSL), utilise multiple sub-channel carriers, e.g. in a DMT environment, to provide an adaptive system that mitigates the effects of cross-talk by selectively ignoring noise-effected sub channel carriers or reducing the number of bits supported by the sub-channels. As will be appreciated, DMT provides a comb of frequency carriers that are each separated modulated and then combined to generate a composite signal envelope. As such, information (both control information and traffic) is distributed across a number of different frequency carriers.

Presently, some xDSL systems (and the like) utilise a time division duplex transmission scheme in which a communication resource (such as a dedicated channel within frequency limits) has a time-split use for unlink and down-link transmissions between line termination equipment (LTE) and customer premises equipment (CPE). More specifically, the up-link and down-link may have different traffic capacities, i.e. there is a fixed but potentially asymmetric symbol capacity (or number of time slots) between the up-link and the down-link assigned for the entire duration of a call. For example, in an Internet-type environment, It is usually beneficial to have a higher down-link capacity since information download is the dominant data flow, whereas voice traffic generally requires equal traffic capabilities in both directions.

In frequency division duplex (FDD) systems, spectrum is allocated between the up-link and down-link.

In relation to bundles of wireline communication resources, it is also important to consider the potentially undesirable effects associated with cross-talk interference. Specifically, with bi-directional communication, the relative location of the lines, for example, between twisted copper-pair causes cross-talk interference to be induced into proximately located wireline communication resources (principally by the mechanisms of capacitive and inductive coupling and by radiation arising from the imperfect nature and performance of the cabling). Moreover, where symmetrical and asymmetrical service are simultaneously required on pairs in the same bundle, cross-talk becomes a significant problem, as will readily be appreciated.

For completeness, it will be understood that near-end cross-talk (NEXT) occurs when electromagnetic interference is induced into a wireline resource that is communicating information in an opposing direction, e.g. down-link (or downstream) information appears as noise in an unlink (or upstream) path. NEXT is undesirable because near-end generated interference is at a level that can potentially swamp data signals received from a remote terminal, which data signals have previously been subjected to attenuation through the transmission path. Furthermore, NEXT increases significantly at the higher frequency components and so is even more undesirable in high frequency data-over-voice wireline systems, such as VDSL. To avoid the harmful effects of Near-End Cross-Talk (NEXT) in a TDD system, an ensemble of collated communication resources must have synchronised and aligned transmissions. However, in a mixed symmetrical-asymmetrical system, NEXT often occurs where the two opposing schemes have either different frequency allocations (in frequency division duplex, FDD) or different time slot allocations (in TDD).

The skilled artisan will appreciate that the partitioning of symbols (or time slots) between up-link and down-link transmissions must also take into account the form of traffic that is to be sent in the respective directions, and this is reflected by the present schemes of fixing symbol (or time-slot) allocation for the entire duration of a call. Specifically, for voice communication (as opposed to data transmissions) it will be appreciated that the nature of verbal expression requires regular information to be conveyed in order to support a coherent understanding. In contrast, data can be of a bursty nature since a reception pattern for information in somewhat irrelevant and there can, in fact, be a reordering of information at a receiver. As such, voice communication in any telecommunication scheme generally requires the fixed provisioning of sufficient capacity/bandwidth.

With regard to Far End Cross-Talk (FEXT), this form of cross-talk affects non-addressed ports of a remote terminal in other words, FEXT occurs when electromagnetic interference (i.e. noise) is induced into a wireline resource that is communicating information in a similar direction, e.g. upstream (or up-link) information appears as noise in another upstream wireline resource to an extent that performance on a given pair is limited. The effects of FEXT are correspondingly reduced by the attenuation path of the wireline resource However, when multiple separate modem links exist (as supported by a multiplicity of different copper pairs proximally located towards the exchange LTE as a bundle of pairs in the access network and then fanned out to individual drops serving particular CPEs), crosstalk between the numerous signals at (or towards) the exchange presently generates noise that limits the data-rate performance of both a given pair and the entire wireline system, in general. In synchronised systems, FEXT is inherent.

FEXT on adjacent pairs can be severely exacerbated from increased signal strengths at a receiver modem of the exchange LTE for the pair causing the FEXT. More especially, where these adjacent pairs have shorter reaches (i.e. shorter cable lengths), the attenuation of the signal in the wireline resource from such relatively closely located modems (as opposed to remotely located modems) is relatively little and, correspondingly, FEXT induced into adjacent wireline resources can be relatively large. In other words, in instances when FEXT from a relatively closely located modem is introduced into a wireline resource serving a distantly located modem, the FEXT interference effects can be catastrophic and corruption of the data from the distant modem absolute. For this reason, it is accepted that there is a need to "back-off" the power transmitted by the transmitting (CPE) modem in the upstream direction for all but the longest lines. Unfortunately, the necessity for back-off results in inefficient utilisation of the spectrum as a consequence of CPEs served by short loop distances having to forego the benefits of better signal to noise ratios (SNR) and therefore to restrict channel throughput by reducing power and lowering the bit transmission rate. In summary, FEXT is particularly problematic in the up-link at the LTE and limits spectral capacity generally.

The term "self-FEXT" will be understood to mean FEXT arising from use of the same time-slot and/or the same frequency for a common form of service (as opposed to differing services on a common wireline resource, such as a combination of ADSL and VDSL).

With respect to power back-off of a particular copper pair, existing methods propose the measurement of loss (i.e. attenuation) at a single frequency and the subsequent projection of loss for the entire bandwidth for that particular copper pair, and the corresponding determination of upstream power (PSD). This method if unreliable because the power transmission characteristics of a copper pair vary according to frequency and, in the extreme, the selected frequency (carrier) can coincide with resonance, for example, within the wireline resource to an extent that a misleading indication of the general transmission properties of the wireline resource is derived. Additionally, such single frequency techniques utilise a centralised decision-making process for all wireline resources incident to the exchange that limits the performance of all loops to be the same as (i.e. as poor as) the performance associated with the longest reach. Power back off can be achieved on either an equal margin basis or an equal power basis. Equal margin allows for a fixed excess in SNR terms, for example, with respect to all incident lines at the receiver, namely the LTE for upstream communications. In contrast, equal power ensures that the received power at the LTE is the same for all lines at any, several, or all frequencies. In both cases, the power spectral density of the transmitted signal is varied to take into account the variable noise floor and the variable level of attenuation associated with the selected carrier frequency and the loop length.

In an attempt to address the problems associated with cross-talk in baseband line coded systems, some manufacturers have also resorted to echo-cancellation techniques. Unfortunately, while echo cancellation compensates a particular twisted copper-pair for its return duplex path, echo cancellation does not mitigate or even address the effects caused by cross-talk induced by other distinct systems, i.e. other twisted copper-pairs. Furthermore, echo cancellation techniques are generally expensive.

Wireline service must also preserve certain (or sensitive) frequency bands, and in this respect some proposed regulations already require the radio amateur spectral bands (at least) to be notched out (i.e. filtered) to avoid carrier interference through a radiation process from the wireline communication resource. This concept of selective notching is already prevalent in most radio-based communication systems, such as within the Digitally Enhanced Cordless Telecommunications (DECT) system and the Global System for Mobile (GSM) communication, and is reflected in electromagnetic compatibility (EMC) requirements.

Furthermore, as will also be widely appreciated, broadband access schemes require a channel response that satisfies Nyquist's criteria, namely that sampling is required at twice the frequency of the highest information carrier, i.e. sampling occurs at 2f whilst transmission is limited to f and below. The alias-band associated with a particular system actually contains a duplication of the information contained in the baseband.

It will therefore be appreciated that present systems are generally intolerant of the variation in attenuation for different length loops (i.e. lines) and have a performance that is limited to the lowest performance of a copper pair in a bundle this being particularly so in relation to up-link transmissions that are subject to the effects of FEXT.

SUMMARY OF THE INVENTION

According to a first aspect of the present invention there is provided a method of allocating frequency bandwidth in a wireline communication network maintaining a plurality of wireline links between a line termination node containing a plurality of collocated modems and a plurality of subscriber-associated modems located at differing loop lengths from the line termination node, the method comprising he steps of estimating a loop length of at least one wireline link; and partitioning bandwidth on a frequency basis based on estimations of the loop length of the at least one wireline link.

In a preferred embodiment, the step of partitioning bandwidth further comprises the steps of: assigning at least some of the plurality of subscriber-associated modems to a relatively low frequency range bandwidth and limiting a signal strength for all frequency carriers in an upstream direction in the relatively low frequency range bandwidth to a signal strength substantially corresponding to a signal strength received in the upstream direction in relation to a subscriber-associated modem having a longest loop length in the relatively low frequency range bandwidth; and assigning at least one of the plurality of subscriber-associated modems to a relatively high frequency range bandwidth and limiting a signal strength for all frequency carriers in an upstream direction in the relatively high frequency range bandwidth to a signal strength substantially corresponding to a signal strength received by a modem in the line termination node in relation to a subscriber-associated modem having a longest loop length in the relatively high frequency range bandwidth.

The subscriber-associated modems assigned to the relatively low frequency range bandwidth may be excluded, if desired, from the relatively high frequency range bandwidth.

The relatively low frequency range bandwidth is distinguished from the relatively high frequency range bandwidth by a threshold frequency at which the received signal strength in the upstream from a subscriber having the longest loop length in the relatively low frequency range bandwidth becomes one of: substantially indistinguishable from a noise floor of the system; and inadequate for supporting useful data transmissions.

In another embodiment of the present invention there is provided a method of partitioning bandwidth comprises the step of: assigning base-band to a first group of subscriber-associated modems; and assigning alias-band frequencies to a second group of subscriber-associated modems having shorter loop lengths than at least some of those subscriber-associated modems in the first group.

The second group of subscriber-associated modems may contain modems requiring a reduced channel capacity.

In a second aspect of the present invention there is provided a wireline communication system comprising line termination equipment coupled to a plurality of modems via wireline resources of varying loop length, the wireline resource having means for providing a frequency partitioned bandwidth for supporting a plurality of upstream transmission from the plurality of modems to the line termination equipment, and wherein the bandwidth is partitioned based on loop length basis.

Preferably, the second bandwidth includes the first bandwidth and a further portion of bandwidth above the first threshold frequency, and wherein the second communication has a power spectral density limited so as to provide the predetermined signal strength level to the line termination equipment in the first bandwidth and a different power spectral density providing a different received signal strength in the second bandwidth.

In another embodiment the means for providing a frequency partitioned bandwidth further comprises: complementary switchable filters in the line termination equipment and the plurality of modems, the switchable filters arranged to select between base-band and alias-band: means for assigning base-band to a first group of modems; and means for assigning alias-band frequencies to a second group of modems having shorter loop lengths than at least some of those modems in the first group.

The second group of subscriber-associated modems contains modems generally require a reduced channel capacity.

In another aspect of the present invention there is provided a modem-management system combination comprising means for providing a frequency partitioned bandwidth based on a loop length of a wireline resource.

The numerous aspects of the present invention therefore provide an improved performance for FEXT-limited communication systems through the segregation of frequency carriers based on loop length. Put another way, the present invention provides partitioning of a larger proportion of the available spectrum based on loop length, since the power spectral density of channel resources assigned to CPEs located relatively close to an LTE can be increased to support higher bit rates by virtue of the assigned communication resources, including spectrum being isolated in frequency from those channel resources used by CPEs remotely located from the LTE. In this way, overall system performance is improved and cross-talk reduced on a general basis within the system. Indeed, the cross-talk environment can be reduced by virtue of the fact that, provided sufficient capacity exists within the higher frequency bands. GPEs relatively closely located to the CPE (in terms of loop length) can benefit from the exclusive use of higher channel frequencies to an extent whereby lower channel frequencies may be used solely to service relatively distantly located GPEs (i.e. those CPEs having a long loop length).

Having regard to another inventive notion, there is provided a method of allocating frequency bandwidth for communication in a wireline system supporting transmissions between a plurality of subscribers and a central node, said transmissions limited to a predetermined maximum power level for the wireline system and wherein the wireline system has a theoretical interference floor, the method comprising: having regard to the theoretical interference floor, identifying a maximum frequency at which reliable communication is deemed occur between a selected subscriber at a first distance and the central node and transmitting information at the predetermined maximum power level; attenuating the predetermined maximum power level for transmissions at said maximum frequency between at least a second subscriber at a second distance and the central node when the second distance is shorter than the first distance, thereby to limit interference: in relation to a second frequency higher than said maximum frequency at the first distance, transmitting information at the predetermined maximum power level; and at frequencies intermediate between the first frequency and the second frequency and for subscribers at nominally constant distance from the central node increasing transmit power levels towards the predetermined maximum power level.

In a preferred embodiment a level of increase in the transmit power for the intermediate frequencies is determined as an attenuation of the predetermined maximum power level, the attenuation calculated as the loss arising from a cable at a frequency in question for a length difference between a length in question and a length whose maximum frequency is the frequency in question.

Preferably, the method of the further inventive notion further comprises the step of, in relation to subscriber at nominally constant distance from the central node, transmitting at the predetermined maximum power level for frequencies above the second frequency.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
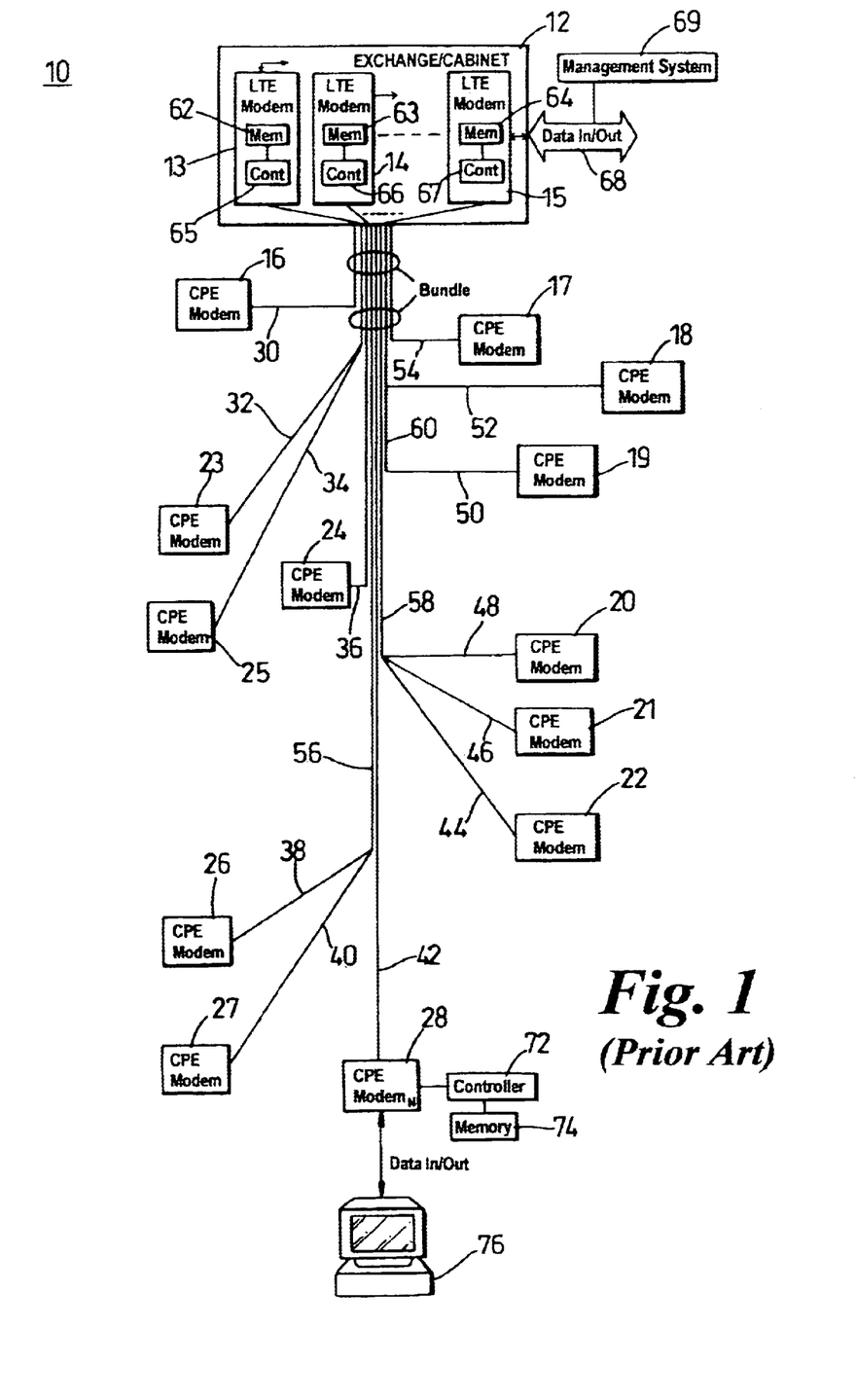
FIG. 1 is a schematic diagram of a typical wireline communication system that may be functionally modified to support the concepts of the present invention.

FIG. 1 is a schematic diagram of a typical wireline communication system 10 that may be functionally modified to support the concepts of the present invention. The wireline system 10, which supports data over voice in a FEXT limited and (typically) xDSL-type environment, comprises an exchange (or cabinet) 12 usually containing a multiplicity of LTE modems 13–15 each separately coupled to a subscriber (CPE) modems 16–28 through individual (or sometimes shared) twisted pairs 30–60. The twisted pairs 30–60 are typically made of adjoining lengths of copper, although aluminium sections are sometimes present.

The twisted pairs may also be realised as non-terminated cable pairs in which so-called "bridge taps" exist. As will be understood, such non-terminated cables typically exhibit resonance characteristics at xDSL frequencies, which bridge taps therefore result in the production of notches in an insertion loss measurement of the cable. The twisted pairs are often unshielded.

Each LTE modem 13–15 in the exchange 12, which may be one of many within the wireline communication system 10 as a whole, typically comprises a separate memory 62–64 and an associated controller 65–67 that oversees the operation of each LTE modem 13–15. Each LTE modem therefore provides an interface to the twisted pairs 40–68. The controller 65–67 is usually realised as a microprocessor or digital signal processor (DSP) and generally functions, without limitation, to control encoding and modulation of data onto channel carriers, and also provides error correction, interleaving of data, operation timing, baud rate and the administration (i.e. the generation and interpretation) of control information in relation to a call The memory 62–64 stores call-related information and system algorithms required for functional operation. Furthermore, although specific detail of the exchange has been omitted for the sake of clanty, transmit and receive chains within the exchange 12 act to provide an information interface 68 (in the sense of both analog voice and digital data). The exchange/cabinet 12 (which can generally be described as a network terminating node) also usually has a management system 69 that orchestrates operation of the exchange 12 and acts to accumulate data pertaining to the instantaneous or historic operation of the network.

The structure of each CPE modem 16–28 is functionally complementary to that of the LTE modems 13–15, as will be readily appreciated. More particularly, each CPE modem 16–28 generally provides a line interface to a twisted pair, an interconnected controller 72 manages the operation and timing of the CPE modem (as shown in relation to CPE modem 28), while some memory 74 is also associated with the controller 72. Each CPE modem allows interconnection of a computer 76 or the like to the exchange. Furthermore, while the GPE modems 16–28 are shown as physically separate entities, It will be appreciated that the modems may, in fact, be integral within the computer or the like.

The LTE and CPE modems may support a number of alternative communication protocols, such as discrete multi-tone, with the modems capable of operating across a wide bandwidth, typically from a few kiloHertz to several (and usually tens of) MegaHertz.

The wireline communication system 10 of FIG. 1 therefore has a tree-like structure in which at least one bundle 90 of collocated twisted pairs feeds into the exchange (or cabinet) 12, while each bundle 90 of twisted pairs branches with distance from the LTE to provide individual (or shared) drops to specific CPE modems 16–28. Usually, each branch from the bundle 90 occurs at a street cabinet or kerb-side unit, as will be appreciated, whereby each branch may, in fact, support more than one twisted pair, CPE modems 16–28 within the wireline communication system 10 are therefore distributed at different loop distances from the LTE 12. However, it will be appreciated that the physical location of each CPE modem 16–28 may not be indicative of the loop distance because the loop may, in fact, be circuitous and indirect.

Figure 2:
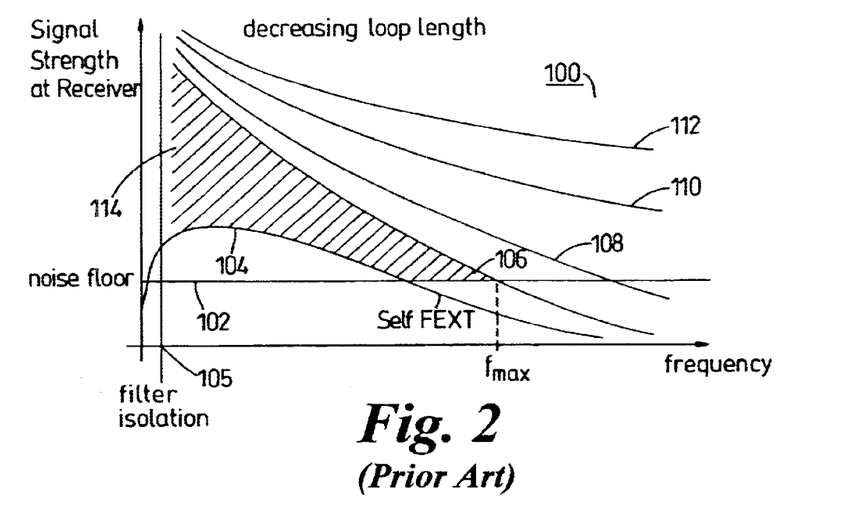
FIG. 2 is typical spectral diagram, associated with the wireline communication system of FIG. 1, illustrating useable bandwidth.

FIG. 2 is typical spectral diagram 100, associated with the wireline communication system of FIG. 1, illustrating useable bandwidth. The ordinate axis of the spectral diagram represents the strength of the received signal, whereas the abscissa is increasing frequency. A noise floor 102 generally represents the limit at which information can be received by virtue of the carrier having a discernible signal level. In addition to the noise floor 102, self FEXT 104 modifies (i.e. raises) the noise floor at lower frequencies; the effects of self FEXT, however, become insignificant at relatively high frequencies where self FEXT actually drops below the noise floor 102 by virtue of path attenuation, as shown in the diagram. The spectral diagram 100 further shows a low frequency cut-of point 105 indicative of isolation achieved in the frequency spectrum by a filter arranged to separate relatively low frequency (e.g. voice) transmissions from relatively high frequency (e.g. xDSL) data transmissions. Additionally, a plurality of loop transmission characteristics 106–112 (i.e. path loss characteristics) indicate that decreasing (i.e. shorter) loop lengths provide increasing capacity by virtue of the fact that the area under each of these loop transmission characteristics represents effective modulation symbol space. A signal to noise ratio (SNR) at a particular frequency is therefore indicated by the vertical displacement on the diagram between the noise floor 102 (as modified by any self FEXT component) and the intersection with a selected loop transmission characteristic, e.g. curve 106.

An area 114 bordered by the noise floor 102, the self FEXT curve 104, the filter isolation 105 and the longest loop transmission characteristic 106 represents the limiting symbol capacity and operating frequency for conventional wireline communication systems on the network/bundle. Indeed, the operating frequency of such a conventional system is limited to $f_{max}$ since power back-off is implemented within the present systems to avoid FEXT arising at the LTE from using the improved SNRs of the shorter loop distances as indicated by the loop transmission characteristic 108–112. In other words, the upstream PSD of the shorter loops is limited such that the received power at the LTE modern is the same as that for the longest loop.

With general regard to the loop transmission characteristics 106–112, it will be appreciated that there is a diminishing SNR (i.e. increasingly unacceptable levels of SNR) with frequency. Consequently, at increasing frequency there is less capacity for traffic. In other words, one can effectively modulate less information with increasing frequency.

The underlying concept that is common to each of the preferred embodiments of the present invention is to utilise segregated (and potentially mutually exclusive) frequency bands for differing subsets of users compiled on a loop length basis and such that FEXT is reduced in relation to upstream transmissions and crosstalk, preferably, is reduced by limiting the number of subscriber in relation to each frequency band provided for each subset of users. To this extent, one must first ascertain (estimate) the lengths of the loops to the various subscribers (CPEs) in the wireline communication system (as serviced from an LTE).

Figure 3:
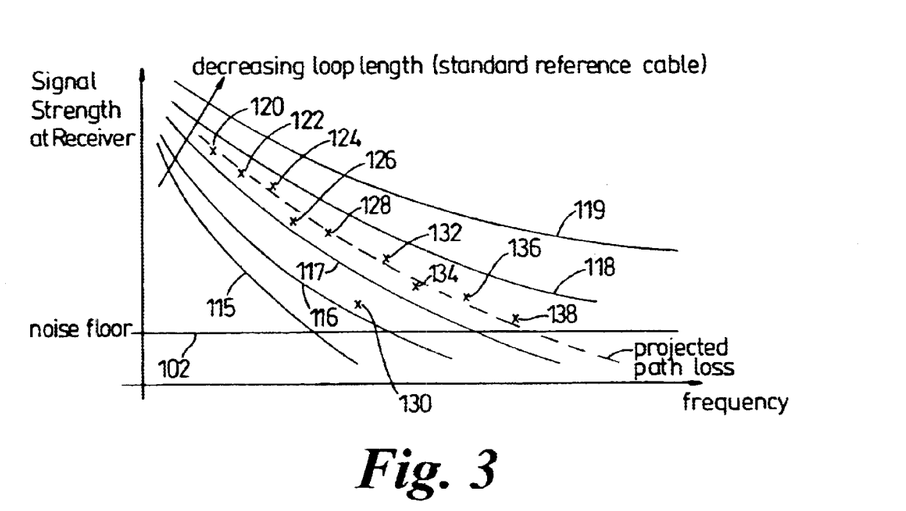
FIG. 3 illustrates, in accordance with the present invention, mapping of measured frequency-related performance characteristics against theoretical loop performance curves.

To represent the path loss characteristic, a preferred embodiment of the present invention uses a modem training and set sequence to establish a mapping of measured frequency-related path loss characteristics against reference path-loss loop characteristics 115–119 for a standard reference cable type, as shown in FIG. 3. The reference path-loss loop characteristics 115–119 are pre-stored in memory either as a mathematical model with appropriate parameter values or as a discrete set of curves. Such standard reference cable data dictates the profile of path loss with respect to frequency for differing lengths of wireline (e.g. twisted pair) resources.

The training sequence is generally arranged to have minimal effect on other systems, and so it is preferably, in a DMT environment, to limit the number of carriers used for training purposes.

The reference path-loss loop characteristics 115–119 can be stored in the memory associated with either the CPE or the LTE, and the determination of loop length based upon either a "blind" or an informed basis, i.e. whether one or both of the CPE and LTE modems are aware of the measured path loss values for the line under test and, therefore, whether one or both of the CPE and LTE modems are involved in the final loop length assessment.

With respect to the mechanism by which measurement and length assessment takes place, it is preferred that, during training, a first modem transmit a training sequence comprised across all available sub-channel carriers, although the training sequence could be reduced to a selected number of carriers to expedite the process. The training sequence, as will be appreciated, is comprised from a plurality of predetermined symbols, with the power spectral density for the training sequence (or the transmitted power associated with each symbol) fixed. Since the training sequence is known by the addressed modem and the level of transmission or the PSD of the sequence is also known, the addressed modem is able to record a path loss characteristic for at least some of the carrier frequencies. Consequently, the measured path loss characteristic for individual frequencies 120–138 can be plotted and compared with respect to the reference path-loss loop characteristics 115–119. As will now be appreciated, the path loss characteristic varies with both loop length and as a function of frequency (and specifically as the square root of the frequency).

Once the path loss characteristics 120–138 for an actual loop is measured/plotted, the controller 72 of the CPE modem or the controller 65–67 of an LTE modem reference the measured path loss characteristic to the standard references provided by the reference path-loss loop characteristics 115–119. Specifically, by using a line fitting technique, the length of the loop between the modems can be fitted to a reference cable path-loss characteristic best resembling its profile. In other words, in a preferred embodiment, the actual length of the loop is represented as an equivalent length of a standard reference cable type, with the length referenced either as a physical length (e.g. metres) or as a loss (e.g. dB) at some frequency.

As previously stated, the preferred embodiment uses a training sequence distributed across available frequencies. This is preferable because use of a training tone on a single frequency could be influenced by the existence of bridge-taps on the loop or an interferer. Use of several frequencies therefore provides the ability to discard those path loss measurements that deviate from a smooth path loss-characteristic curve.

The line fitting technique may employ a mechanism such as least square-root fitting in which frequencies having spurious path loss characteristics beyond a predetermined tolerance of the apparent best reference loop performance curve can be rejected. Such statistical techniques will be readily appreciated. For example, in relation to the plot of actual path loss values for a wireline connection as shown in FIG. 3, measurement point 130 could be rejected as being an anomaly from the general trend of the curve by virtue of a statistically significant variation from a predetermined threshold. The actual length of the wireline interconnecting the modems can be determined using the measured path loss (at either the CPE or LTE modem) to extrapolate length, I, based on the loop performance curve of the standard reference cable.

As indicted, possible technique for establishing a power spectral density for upstream transmissions involve "blind" methods where the CPE modem determines the PSD from the training sequence, or an informed (or "communicative") method where information exchange between the CPE and LTE modems is required, and the PSD for upstream transmission by the CPE modem is determined by either the CPE modem or the LTE modem. It is therefore possible to select one of the following four basic options:

1. The CPE modem estimates the path loss characteristic, references the path loss characteristic to a standard reference loop (cable) length and from that determines the PSD for all transmitted (upstream) frequencies to meet the receiver (LTE) SNR requirements. This is probably realised as a "blind" method and makes use of the management system 69. Specifically, the LTE modem must relay information relating to the longest loop length of the system and operating frequency band limits to the CPE modem, as obtained from the management system 69.

2. The LTE modem estimates the path loss characteristic for the upstream transmission and informs the CPE modem which itself determines what its PSD must be. This is a "communicative" method. The LTE modem must relay information from the management system pertaining to the longest loop length of the system, the operating frequency band limits for each subset and the determined length of the serving loop, this amount of information represents relatively little control overhead.

3. The LTE modem estimates the path loss characteristic for the upstream transmission, references the path loss characteristic to a standard reference loop (cable) length and determines the PSD that the CPE modem must send It then informs the CPE modem what PSDs to use across the upstream bandwidth. This is a "communicative" method and also requires the LTE modem to relay management information.

4. The CPE modem sets an initial PSD (determined to be safe in relation to other twisted pairs based on an initial downstream measurement at the CPE modem), and there ensues an iterative process where the LTE modem estimates the upstream path loss characteristic, informs the CPE modem that reacts by adjusting its PSD, and so on until the desired upstream power is achieved. In this method, both ends of the connection must be aware of PSD limitations to prevent accidental pollution of other lines.

In all of the above instances, path loss can be characterised in a number of ways, namely: i) as the actual loss at a particular frequency; ii) as the vector of losses at several frequencies: or iii) as the broadband measurement of losses at all available frequencies.

In wireline systems to date, the longest loop length has previously dictated the PSD for power "back-off" of CPE transmitters on the shorter loops in the system; this is so as to avoid FEXT. In other words, the SNRs of the shorter loops are restricted by clamping the operating performance of the shorter loop to the path loss of the longest loop in the system. Putting this another way, the available spectrum (before back-off) for or successively shorter loops is generally greater (especially at higher frequencies) than for the longer loops. The present invention makes use of the fact that for most loops there are regions of available spectrum (at frequencies above the maximum frequency $f_{max}$ of the longest loop) that are useable without power back-off. Such high frequency regions, although having a reduced SNR, can still provide sufficient capacity to support data at or above one bit per carrier in a DMT type system. In this respect, FIG. 4 shows frequency segregation based on loop length as proposed by a preferred embodiment of the present invention.

Figure 4:
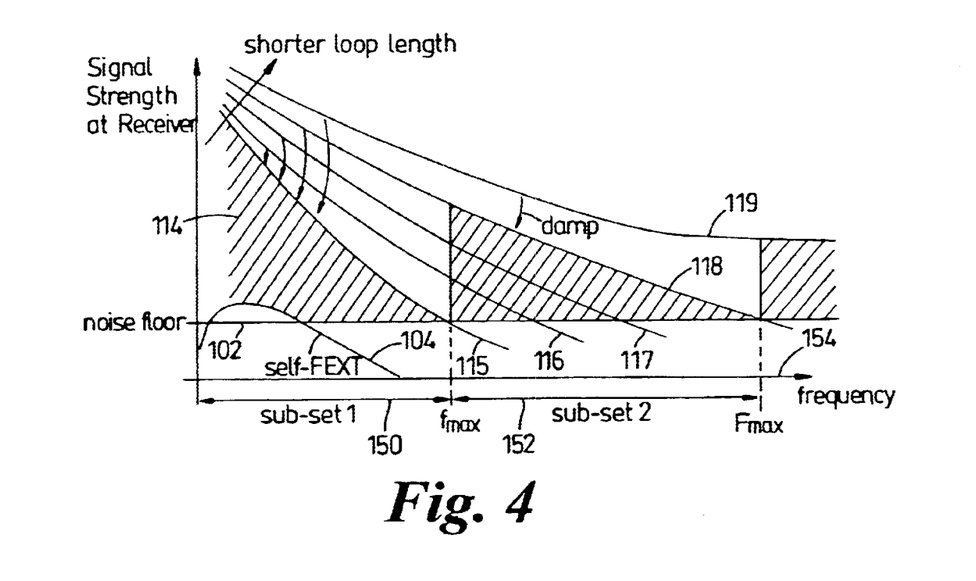
FIG. 4 shows frequency segregation based on loop length as proposed by a preferred embodiment of the present invention.

In common with the earlier spectral diagrams of FIGS. 2 and 3, FIG. 4 illustrates the noise floor 102, the effects of self FEXT 104 and a plurality of loop performance curves 115–119 for differing loop lengths on the network/bundle. The useable symbol space 114 at frequencies lower than $f_{max}$ (i.e. the point that the loop performance curve 115 of the longest loop intersects the noise floor 102) is restricted for all lengths of loop to an extent that the available (higher) SNRs of the shorter loops at frequencies below $f_{max}$ are clamped such that the power received at the LTE modem is the same as for the longest loop However, at frequencies above $f_{max}$, a preferred embodiment of the present invention now makes use of the symbol space between at least one other loop performance curve and the noise floor. For example, while the SNR and hence the capacity of higher frequency transmission is not as good at high frequencies as it is at low frequencies, there is still capacity that can be utilised and which capacity is in a portion of the frequency spectrum that is segregated (i.e. frequency isolated) from baseband. Consequently, the spectrum can be divided to support different subsets 152–154 of subscribers based on the loop length to subscribers (i.e. CPE modems), although the channel capacity provided to each subset of subscribers is reduced by virtue of the decreasing loop performance profile with frequency. In other words, there is some exploitation of the good SNR generally afforded by the shorter loops. As will be appreciated, there can be more than two divisions within the frequency spectrum, with the frequency bandwidth of each subset terminated by the intersection of a defining loop performance characteristic (and hence loop length) with the noise floor 102. Again, each successive subset is limited to the received signal for the longest loop in that subset, i.e. even shorter loops must still be clamped (in terms of PSD to give like received signal strengths at the receiver) to the longest (and hence defining) loop in a particular service subset. The operational effect of using these additional frequency bands is to bestow an increased upstream bit-rate on this selected set of loops that fall within the different subsets.

Figure 5:
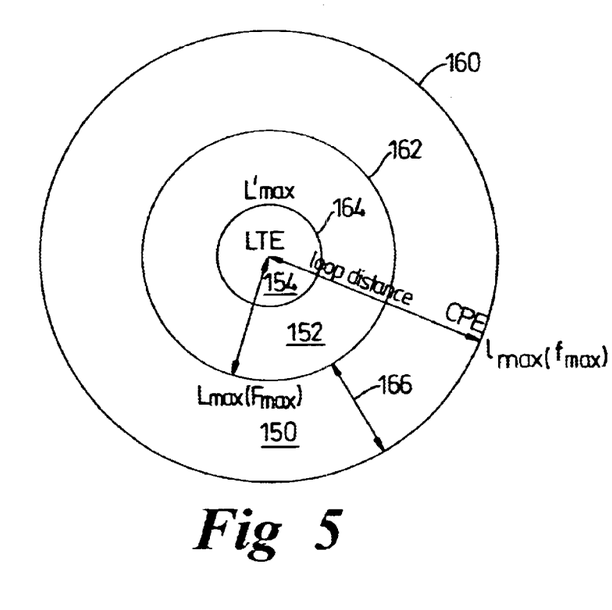
FIG. 5 illustrates, in a complementary fashion to FIG. 4, service subsets of CPEs.

The inventive principal of FIG. 4 is shown in a complementary fashion in FIG. 5 in which service subsets of CPE modems are defined by a loop distance measure, namely the concentric circles 160–164 in the figure. Expressed in a different fashion, the LTE modem is located at the centre of the concentric circles 160–164 and represents a zero loop distance displacement therefrom. The point $I_{max}$ ($f_{max}$) represents the longest serviceable loop to a CPE modem coupled to the LTE modem, which point therefore corresponds to $f_{max}$ in FIG. 4. An intermediate concentric circle 162 represents a second subset of subscribers that can utilise a frequency band between $f_{max}$ and $F_{max}$ (in FIG. 4). Any CPE modem served by a loop length intermediate between $I_{max}$ and $L_{max}$ (as represented by vector 166) is clamped to the loop performance curve of the longest loop, namely the loop performance curve associated with $I_{max}$ ($f_{max}$). In a similar fashion, a third subset of CPEs could benefit from used and non-interfering frequency spectrum provided within the innermost concentric circle 164.

An example implementation might be where all lines longer than half the maximum reach are backed-off to the received PSD of the longest line, whilst wireline resources shorter than half the length of the maximum reach are backed-off to the received PSD of the longest line in the frequencies below $f_{max}$, but are also allowed to utilise the spectrum above $f_{max}$ backed-off to the available SNR for the loop with half the maximum reach. With this implementation, those customers closer than half the longest reach could be offered a "gold" service, whilst those further out could only receive the "silver" service at a reduced rate.

The present invention can therefore reduce the undesirable effects of cross-talk in a number of ways, while also increasing capacity within the wireline system generally. First, since FEXT is prevalent in relation to upstream transmissions, the present invention releases additional bandwidth at relatively high frequencies for use by CPEs with the shorter loop lengths; this leads to an increase in capacity since these CPEs may also benefit from using the lower frequency ranges whilst mitigating against crosstalk limitations arising from providing such services over a common spectrum. In other words, CPEs on the shorter loop lengths can benefit from an increased bit rate for upstream communications. In this way, an asymmetrical network may, in fact, become more symmetrical in relation to devices on a short loop length. Second, if limited upstream capacity is required, CPEs served by the shorter loop length wireline connections may, in fact, be able to utilise the high frequency subsets (i.e. those above $f_{max}$) for all upstream communications whereby crosstalk, in general, is reduced within the wireline communication system. In other words, CPEs in a first subset served by upstream frequencies below $f_{max}$ could be made mutually exclusive (in terms of frequency domain requirements) to those CPEs served by upstream frequencies above $f_{max}$. However, mutual exclusivity will result in decreasing baud rate in the upstream for subsets successively using higher frequency bands.

In relation to downstream transmissions, the entire bandwidth can be used since FEXT is mostly an issue within low level transmission supported by collocated wireline communication resources.

Figure 6:
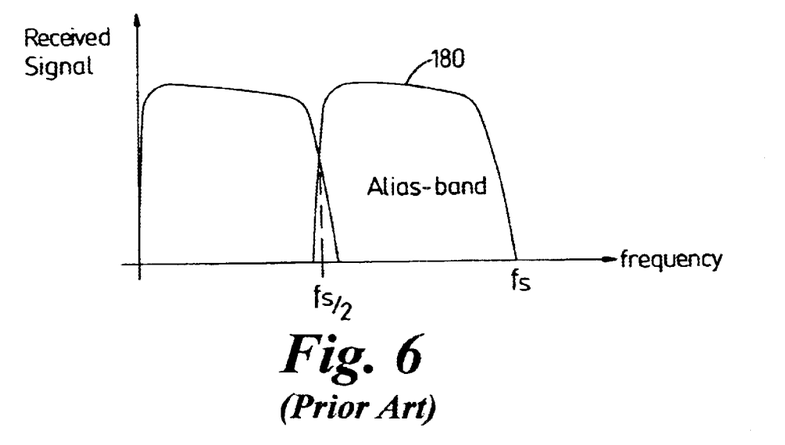
FIG. 6 is a frequency domain representation of a passband and associated alias-band.

Another embodiment of the present invention makes use of the alias-band, and in this respect FIG. 6 shows a frequency domain representation of a passband and associated alias-bend.

For an understanding of the second embodiment of the present invention one must first be reminded that, in normal transmission of a digital modem, the data is modulated in the frequency range 0 to $f_s/2$, where $f_s$ is the sampling frequency. The alias-band 180, between $f_s/2$ and $f_s$, is not utilised, with the transmission being passed through a low pass-filter.

The second embodiment of the present invention uses the alias-band for data transmission for selected lines so as to allow for the coexistence of services with different frequency or time-slot requirements on copper pairs in the same cable bundle. Specifically, the alias-band utilises frequencies with capacity not available to the longer loops. Indeed, in a similar fashion to that already described in relation to the preferred embodiment of FIG. 4, the alias-band can be utilised for shorter reach loops instead of the base-band, although the shorter loop lengths will exhibit lower capacity than the base-band. Moreover, these shorter loop lengths, by virtue of their frequency displacement into the alias-band, would not contribute cross-talk to the longer loop lengths used in the base-band only, and vice versa. Where any portions of the alias-band are above $f_{max}$ the received power requirements will be dictated by the longest loop utilising the those frequencies in the alias-band.

In relation to a structural and functional realisation of the second embodiment of the present invention (in terms of a DMT-based modem, for example), all functions within a DMT system are the same for both short and long loop lengths with the exception of: i) the relative frequency placement of transmission and reception anti-alias filters: and ii) carrier mapping to avoid amateur bands and distress frequencies arising because such carriers are in different parts of the frequency space. However, since a significant problem is upstream FEXT between relatively long and relatively short loop lengths in the same bundle, the system is arranged to use base band for downstream transmissions but the alias-band for the upstream. Of course, modems configured to operate in this way require the provisioning of complementary flip-filters that are selectively switched in both the LTE modems and CPE modems for transmission and reception therebetween; the required structure of the filter will, of course, be readily appreciated by the skilled addressee and generally takes the form of a parallel arrangement of switchable low-pass and band-pass filters.

The second embodiment of the present invention therefore effectively uses the alias-band to provide a further degree of frequency division duplexing, where frequency allocation is governed not only by upstream or downstream traffic, but also according to the reach of the line. In other words, there is a splitting of frequency space between the base band and alias-band to reduce FEXT.

In summary, the present invention relates to methods that can be used, for example, by DMT modems in a wireline communication resource to improve performance that has previously (and to date) been limited by cross-talk generally. In one embodiment, several methods are proposed that can be utilised to "back-off" the power in upstream transmission for a modem such that each modem connection over a different reach of local loop presents a similar power spectral density at the receiver (LTE) modem, i.e. there is a selected deviation from conventional power back-off. A further embodiment proposes a method of utilising higher frequency regions of the spectrum for a limited subset of customers with shorter reach loops, such that they can receive a higher grade (higher bit-rate) service than those with longer loops on the same network/bundle, and additionally one which is enhanced by limiting the subset of such loops. Moreover, by providing subsets of customers distributed in frequency and based on loop length, FEXT and NEXT can be reduced by making such subsets mutually exclusive. However, as will be appreciated, FEXT is only an issue with respect to up-link transmissions, and so downlink transmissions may benefit from use of the entire frequency spectrum. In fact, the principles underlying the present invention can be employed to provide both symmetrical and asymmetrical services on loops in the same bundle. In a third embodiment, a method is proposed that relies on using the out-of-band (alias-band) spectrum for transmitting data to a subset of customers on shorter reach pairs, with a resulting enhanced performance on all other lines due to reduced cross-talk in the base-band.

Adaptation of the wireline communication system of FIG. 1 to support the present invention is minimal and, in a preferred embodiment, is accomplished my modifying (e.g. up-grading) the system software in the memories of at least one of the LTE modems and the CPE modems. Basically, for migration from the existing system to an enhanced performance system provided by the concepts of the present invention merely requires modification of the functionally and specifically any underlying control algorithms. Indeed, in the second aspect of the present invention, the controller of the respective LTE and GPE modems can be implemented to support digital filtering whereby no physical switching between the pass band and the alias-band is required. Of course, the present invention could be implemented by a hardware change, but this relatively expensive when compared with issuance of software up-grades; this also assumes that the modem (equipment generally) can operate effectively in the higher frequency regions of the spectrum that are now accessible by virtue of the frequency segregation technique of the present invention.

Figure 7:
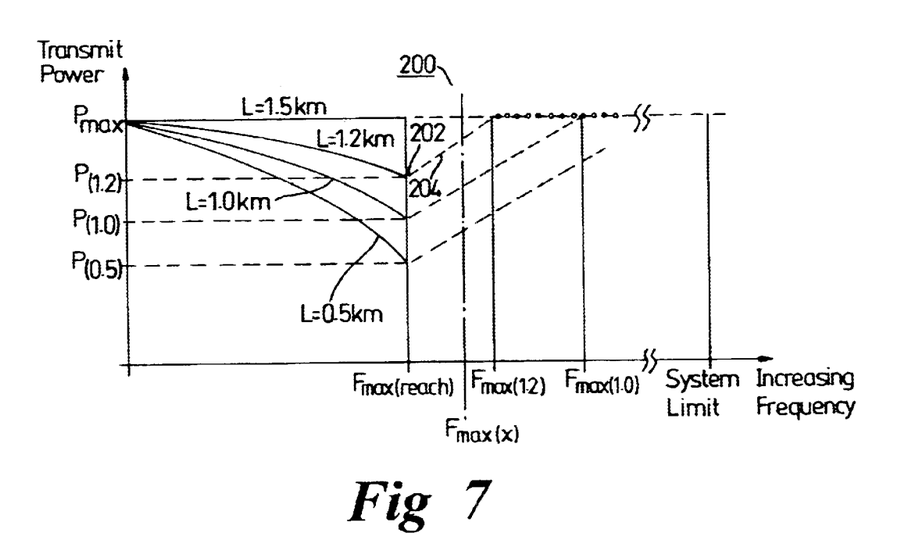
FIG. 7 is a graphical representation of frequency availability in a wireline system of a second inventive notion.

FIG. 7 shows a graphical representation of frequency availability in a wireline system of a second inventive notion. The ordinate axis of FIG. 7 represents transmitted power from a terminal, and as can be seen there is an arbitrarily selected maximum transmit power $P_{max}$ for all wireline terminals, as will be readily appreciated in view of the theoretical noise floor, a maximum transmission frequency exists for a particular length of loop, with all subscriber terminals closer in than that length of loop having to attenuate their respective transmit power levels at that particular frequency to avoid causing unacceptably high FEXT. Putting this another way, shorter loop lengths transmit at lower power levels in relation to a frequency corresponding to a maximum reliable frequency for the particular loop length. In other words, from FIG. 7, the frequency $F_{max(reach)}$ represents the greatest frequency that can be reliable used by a subscriber at the maximum serviceable reach of the system whilst ensuring that coherent data is received at an addressed central node. For the sake of explanation, it is assumed that the maximum reach is, say, 1.5 kilometers (km).

Now, considering a second subscriber terminal that is closer to the addressed central node than the subscriber at the maximum loop length/reach, the second subscriber terminal is able to utilise an increased frequency bandwidth whilst maintaining a reliable connection to the addressed central node. The second subscriber terminal, located at a distance of, say, 1.2 km from the addressed central node, therefore has a maximum reliable frequency at $F_{max(12)}$. Since frequencies above $F_{max(reach)}$ have not previously been used in relation to subscriber terminals further away from the addressed central node, it is possible once again to transmit the frequency $F_{max(12)}$ at the maximum power level $P_{max}$. Putting this in a slightly different way, a subscriber at, say, reach 1.2 km has a priority in relation to transmit power at $F_{max(12)}$. Now, because $F_{max(12)}$ actually itself corresponds to a maximum (reliably) serviceable length, an inflection 202 therefore occurs in the power curve for constant length that results in it being possible to increase 204 transmit power at increasing maximum serviceable frequencies corresponding to shorter lengths beyond $F_{max(reach)}$.

At intermediate frequencies between $F_{max(reach)}$ and $F_{max(12)}$, for example, it is necessary to reduce the transmit power so that all upstream signals in the wireline/cable at that point and at that frequency are at nominally the same level.

It is therefore possible to produce a continuous function by plotting attenuation for fixed length at different frequencies between $F_{max(reach)}$ and the maximum serviceable frequency for the length in question. It is therefore possible to provide greater capacity (in terms of increased frequency bandwidth) to subscribers more distantly located from a nominal central node, although this is at the slight expense of restricting the available frequency capacity (and hence performance) of subscribers closer in to the nominal central node. The system benefits do, however, generally outweigh the possible loss of performance experienced by near-in subscriber terminals/units.

The attenuation is therefore calculated as the loss arising from the cable at the frequency in question for a length difference between the length in question and the length whose maximum frequency is the frequency in question.

Expressing this is a mathematical way, suppose we envisage the use of a reference length algorithm for transmit power as:

$$Tx\,(F,\,L) = T\_max - hypothetical\_cable\_loss\,(F,\,L\_max) + hypothetical\_cable\_loss\,(F,\,L)\text{ decibels}$$

where $L < L\_max; F < F\_max$: and $T\_max$ is the maximum power spectral density allowed in the system.

The nominal reach of the system is therefore identified as $L\_max$, and this can be linked to a maximum usable frequency $F\_max$ controlled by the assumed noise and/or background FEXT. Therefore:

$$F\_max = f(L\_max) \text{ or } L\_max = f(F\_max) \text{ which defines } L\_max(F)$$

Defining design $L\_max$ as the design limit or maximum reach, then:

$$Tx\,(F,\,L) = T\_max - hypothetical\_cable\_loss\,(F,\,design\_L\_max) + hypothetical\_cable\_loss\,(F,\,L)\text{ decibels}$$

and $$F > F\_max(design\_L\_max) \text{ and } F < F\_max(L)$$

implies $$Tx\,(F,\,L) = T\_max - hypothetical\_cable\_loss\,(F,\,L\_max(F)) + hypothetical\_cable\_loss\,(F,\,L)\text{ decibels}$$

In relation to the constant length curves, once the transmit power has again peaked (with increasing frequency but correspondingly shorter serviceable loop lengths), it is possible to maintain transmissions at the elevated power level of $P_{max}$. This second benefit arises from the fact that there is usually an exploitable difference between the theoretical noise floor and the actual noise floor. More especially, since cross-talk noise at subscriber closer to the addressed central node is always attenuated by distance of cable from the transmitting device, cross-talk noise is generally no worse than that otherwise arising from a close neighbour using the same transmission frequency.

An alternative algorithm to that discussed in relation to the second inventive notion uses a step-wise approximation to $L\_max(F)$ that is always less than $L\_max(F)$. This therefore defines a set of annulus regions and frequency bands. In each band $L\_max(F)$ and $F\_max(L)$ are assumed constant, with this approach trading an increase in short reach capacity for near reach maximum capacity and reducing the rate at which margin improves as reach is reduced below the target minimum reach. The best outcome occurs if the transmit power spectral density (Tx PSD) can be adjusted in a continuous basis, as in DMT. For a multi-band carrier solution, it is assumed that upstream power control is based on a simple monotonic equalization in each upstream band, or uses a flat scaling. As will be appreciated, it will be advantageous to have many upstream bands to approximate the discontinuous PSDs developed by the preferred algorithm of the second notion of the present invention.

As an example of the way in which one can define the hypothetical cable loss, one could use the approximate relation that loss in decibels is proportional to the square root of frequency where the constant of proportionality is well known for the cable types in question. This constant of proportionality, as will readily be appreciated by the skilled addressee, emanates from the electromagnetic field equations relating to skin depth loss. A polynomial approximation could, however, be used in the alternative.

It will, of course, be appreciated that the above description has been given by way of example only and that modification in detail may be made within the scope of the present invention. For example, although the preferred embodiment of the present invention is described in relation to a multi-sub channel carrier (DMT) modem environment, the general principles of the present invention are equally applicable to transmission schemes that use discrete frequency bands for carrying traffic and control information. Furthermore, it will be appreciated that for optimum operation it is preferable to assess the loop lengths to all serviced CPE modems, although the present invention may apply the concepts of the present invention to a reduced number of the total, i.e. the improved service capacity/reduced cross-talk may actually effect a proportional of the CPE modems rather than all in the same network/bundle provided that all shorter length loops in a particular band of frequencies (defining a subset) are clamped back.

The terms "up-link" and "upstream" are interchangeable, as are the terms "down-link" and "downstream".

What is claimed is:

1. A method of allocating frequency bandwidth in a wireline communication network maintaining a plurality of wireline links between a line termination node containing a plurality of collocated modems and a plurality of subscriber-associated modems located at differing loop lengths from the line termination node, the method comprising the steps of:

for each of said plurality of wireline links, estimating a loop length of said wireline link;

arranging said wireline links into at least two subsets of wireline links based on said estimated wireline link loop lengths; and partitioning bandwidth on a frequency basis and allocating said partitioned bandwidth to said subsets of wireline links.

2. The method of allocating frequency bandwidth according to claim 1, wherein the step of partitioning bandwidth further comprises the steps of:

assigning at least some of the plurality of subscriber-associated modems to a relatively low frequency range bandwidth and limiting a signal strength for all frequency carriers in an upstream direction in the relatively low frequency range bandwidth to a signal strength substantially corresponding to a signal strength received in the upstream direction in relation to a subscriber-associated modem having a longest loop length in the relatively low frequency range bandwidth; and assigning at least one of the plurality of subscriber-associated modems to a relatively high frequency range bandwidth and limiting a signal strength for all frequency carriers in an upstream direction in the relatively high frequency range bandwidth to a signal strength substantially corresponding to a signal strength received by a modem in the line termination node in relation to a subscriber-associated modem having a longest loop length in the relatively high frequency range bandwidth.

3. The method of allocating frequency bandwidth according to claim 2, wherein subscriber-associated modems assigned to the relatively high frequency range bandwidth are excluded from the relatively low frequency range bandwidth.

4. The method of allocating frequency bandwidth according to claim 2, wherein subscriber-associated modems assigned to the relatively low frequency range bandwidth are also present in the relatively high frequency range bandwidth.

5. The method of allocating frequency bandwidth according to claim 2, wherein the relatively low frequency range bandwidth is distinguished from the relatively high frequency range bandwidth by a threshold frequency at which the received signal strength in the upstream from a subscriber having the longest loop length in the relatively low frequency range bandwidth becomes one of:

substantially indistinguishable from a noise floor of the system; and inadequate for supporting useful data transmissions.

6. The method of allocating frequency bandwidth according to claim 1, wherein downstream transmissions from the plurality of collocated modems in the line termination node to the plurality of subscriber-associated modems utilise the relatively low frequency range bandwidth and the relatively high frequency range bandwidth.

7. The method of allocating frequency bandwidth according to claim 1, further comprising the steps of:

assessing a path loss for a connection between a first modem of the plurality of subscriber-associated modems and a second modem in the line termination node; and referencing the path loss against reference path-loss loop characteristics for a standard reference cable type to determine a loop length between the first modem and the second modem.

8. The method of allocating frequency bandwidth according to claim 1, wherein the step of partitioning bandwidth comprises the step of:

assigning baseband to a first group of subscriber-associated modems; and assigning alias-band frequencies to a second group of subscriber-associated modems having shorter loop lengths than at least some of those subscriber-associated modems in the first group.

9. The method of allocating frequency bandwidth according to claim 8, wherein the second group of subscriber-associated modems contains modems requiring a reduced channel capacity.

10. The method of allocating frequency bandwidth according to claim 9, wherein downstream transmissions use base-band.

11. A wireline communication system comprising: a line termination equipment containing a plurality of modems; a plurality of wireline links between said line termination equipment and a plurality of subscriber-associated modems located at differing loop lengths from said line termination equipment; and a controller for estimating a loop length of each wireline link, arranging said wireline links into at least two subsets based on said estimated loop lengths, partitioning bandwidth on a frequency basis and allocating said partitioned bandwidth to said subsets of wireline links.

12. The wireline communication system according to claim 11, wherein the line termination equipment is coupled to a first modem through a first wireline resource of relatively long loop length and is further coupled to a second modem through a second wireline resource of relatively short loop length, and wherein a first communication from the first modem to the line termination equipment has a first bandwidth to a first frequency threshold and a first power spectral density providing a predetermined signal strength level to the line termination equipment, and wherein a second communication from the second modem to the line termination equipment has a second bandwidth different to the first bandwidth.

13. The wireline communication system according to claim 11, wherein the second communication contains mutually exclusive frequency carriers to the first communication.

14. The wireline communication system according to claim 11, wherein the second bandwidth includes the first bandwidth and a further portion of bandwidth above the first threshold frequency, and wherein the second communication has a power spectral density limited so as to provide the predetermined signal strength level to the line termination equipment in the first bandwidth and a different power spectral density providing a different received signal strength in the second bandwidth.

15. The wireline communication system according to claim 11, wherein the means for providing a frequency partitioned bandwidth further comprises:

complementary switchable filters in the line termination equipment and the plurality of modems, the switchable filters arranged to select between baseband and alias-band:

means for assigning base-band to a first group of modems; and means for assigning alias-band frequencies to a second group of modems having shorter loop lengths than at least some of those modems in the first group.

16. The wireline communication system according to claim 15, wherein the second group of subscriber-associated modems contains modems requiring a reduced channel capacity.

17. A method of allocating frequency bandwidth for communication in a wireline system supporting transmissions between a plurality of subscribers and a central node, said transmissions limited to a predetermined maximum power level for the wireline system and wherein the wireline system has a theoretical interference floor, the method comprising:

having regard to the theoretical interference floor, identifying a maximum frequency at which reliable communication is deemed occur between a selected subscriber at a first distance and the central node and transmitting information at the predetermined maximum power level;

attenuating the predetermined maximum power level for transmissions at said maximum frequency between at least a second subscriber at a second distance and the central node when the second distance is shorter than the first distance, thereby to limit interference;

in relation to a second frequency higher than said maximum frequency at the first distance, transmitting information at the predetermined maximum power level; and at frequencies intermediate between the first frequency and the second frequency and for subscribers at nominally constant distance from the central node increasing transmit power levels towards the predetermined maximum power level.

18. The method of allocating frequency bandwidth according to claim 17, wherein a level of increase in the transmit power for the intermediate frequencies is determined as an attenuation of the predetermined maximum power level, the attenuation calculated as the loss arising from a cable at a frequency in question for a length difference between a length in question and a length whose maximum frequency is the frequency in question.

19. The method of allocating frequency bandwidth according to claim 17, further comprising the step of, in relation to subscriber at nominally constant distance from the central node, transmitting at the predetermined maximum power level for frequencies above the second frequency.

* * * * *